(12) United States Patent
Majumder et al.

(10) Patent No.: US 10,747,400 B1
(45) Date of Patent: Aug. 18, 2020

(54) SHAPING A RELEVANCE PROFILE FOR ENGAGEMENT

(71) Applicant: Amazon Technologies, Inc., Reno, NV (US)

(72) Inventors: Anirban Majumder, Bangalore (IN); Vinayak Shripad Puranik, Bangalore (IN); Srinivasan Hanumantha Rao Sengamedu, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 406 days.

(21) Appl. No.: 15/380,259

(22) Filed: Dec. 15, 2016

(51) Int. Cl.
*G06F 3/048* (2013.01)
*G06F 3/0482* (2013.01)
*G06F 16/248* (2019.01)
*G06F 16/2457* (2019.01)

(52) U.S. Cl.
CPC .......... *G06F 3/0482* (2013.01); *G06F 16/248* (2019.01); *G06F 16/24578* (2019.01)

(58) Field of Classification Search
None
See application file for complete search history.

(56) References Cited

U.S. PATENT DOCUMENTS

2016/0350307 A1* 12/2016 Verweyst ............ G06F 21/6227

* cited by examiner

*Primary Examiner* — William C Trapanese
(74) *Attorney, Agent, or Firm* — Hogan Lovells US LLP

(57) ABSTRACT

The arrangement and selection of digital content to present to a user can be based at least in part upon the relevance of content, e.g., the probabilities of the user selecting to view more information and/or otherwise engaging with instances of the content. Features of items associated with content presented to a user can be determined, as well as the user's response to items with those features. This data is used to determine the probability of the user viewing and/or otherwise engaging an item having specific values for at least some of those features. The probabilities are combined with abandonment scores associated with a feed position of an interface to ensure that content displayed is optimized for engagement. The items can be ranked based on this engagement determination, in order to select which item content to display and the appropriate arrangement of that content.

19 Claims, 9 Drawing Sheets

SHAPING A RELEVANCE PROFILE FOR ENGAGEMENT

BACKGROUND

Users are increasingly utilizing electronic devices to research, locate, and obtain various types of information. For example, users may utilize a search engine to locate information about various items, such as items offered through an electronic marketplace. Many of these conventional approaches require a user to input a query or navigate to a location from which relevant content can be obtained. It thus can be difficult to present content to a user that might be of interest to a user, but does not require such a manual process on the part of the user. Further, in presenting results, many of these conventional approaches present items in decreasing order of relevance, i.e., the most relevant items are shown first and less relevant items are shown lower in the list of results. While this approach works in search result listings where the users intent it mostly to see specific information, in applications where the user is looking to be inspired, a monotonic profile of relevance can quickly lead to boredom or abandonment. Once a user encounters an irrelevant post, the user may perceive that the relevance of posts further down the list of results will be even lower, which may result in user abandoning their browsing session. Accordingly, providing the user with content that is more likely to be of interest to the user can result in increased user engagement, higher profitability, or other favorable results for the provider of that content.

BRIEF DESCRIPTION OF THE DRAWINGS

Various embodiments in accordance with the present disclosure will be described with reference to the drawings, in which.

DETAILED DESCRIPTION

Figure 1A:
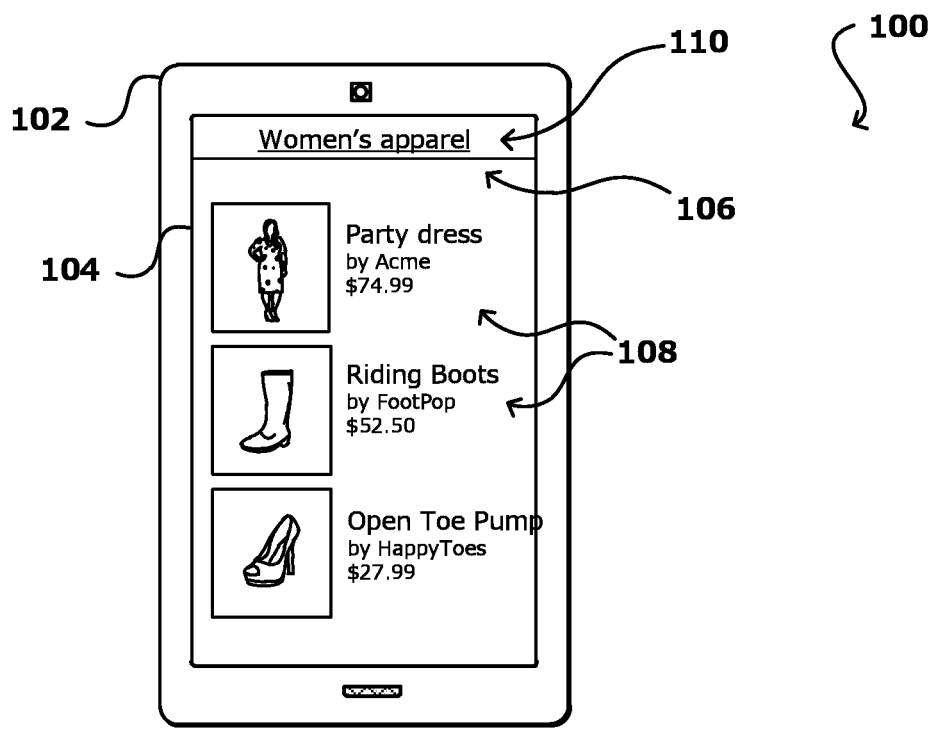
FIGS. 1A and 1B illustrate examples of content for various items that can be presented to a user in accordance with various embodiments.

Systems and methods in accordance with various embodiments of the present disclosure may overcome one or more of the aforementioned and other deficiencies experienced in conventional approaches to determining content to provide to a user. In particular, various embodiments attempt to determine the selection and/or ranking of items (e.g., products, content, web pages, interests, content posts, etc.) to display to a user by shaping a relevance profile optimized for engagement. For example, a user can use a computing device to request content, such as text, documents, audio recordings, video, images, animations, and the like. The content request may be transmitted to another computing device, such as a content server or another user computing device that processes the request and provides the requested content or information regarding the request. The content may be distributed to the computing device as a set of multiple content posts in which a user of the user computing device may be interested. The set of content posts, also referred to as a "feed," may be selected from a larger set of available content posts based on the degree to which individual content posts correspond to the interests of the user. The content posts can be user generated, sponsored posts, or a combination thereof. The content posts may link to third party websites and often times are not central to any one website. In various embodiments, the feed can be updated without user input. For example, the feed may be updated at least upon an expiration of an interval of time, in response to the user initiating the viewing session, or in response to a user interaction with the feed. In this way, in the context of a feed, a user's query for content is implicit in that the user does not need to submit an explicit query for content to be displayed; rather, the feed is generated for a user in response to the user initiating a viewing session (e.g., opening an application) via an application operable to display the feed. For example, a user of a social media system may be presented with a feed of content posts that match the user's preferences, as determined from the user's demographic characteristics, interactions with the social media system, and the like. As another example, a user of a news service may be presented with a feed of articles based on the user's stated preferences, interactions with other content provided by the news service, etc.

From the perspective of a user receiving a content feed, a user experience may be defined in terms of the degree to which content in the feed is of interest to the user. In an effort to provide the most relevant content, as well as to facilitate user engagement, systems use various techniques to analyze and select, from a large set of available content, a subset of content that is relevant to a user's interests. For example, in order to keep a user continuously engaged, the relevance profile used to rank content for display should not monotonically decrease but should instead increase as well. Such a relevance profile is optimized for engagement as content posts further down a feed include content posts may be just as relevant as post displayed earlier in the feed. For example, user behavior with respect to various content can be determined in order to calculate a relevance such as a probability, based at least in part upon values of features of content posts presented to a user, that a user will view content with respect to a specific content post and/or make a purchase or otherwise interact with the content post. In addition to selecting content posts for display based upon relevance, other engagement criteria can be used to ensure that content displayed is optimized for engagement. This can include, for example, determining an optimal order of placement of content in a feed of content as well as displaying content for a variety of types of content posts having different feature values. As additional data for the user is gathered, such as through the user interacting with content having specific feature values, the rankings can be updated accordingly. The rankings and selection can be used to determine content posts to present to a user, and the arrangement of those content posts, which can improve the overall user experience while increasing profit for the provider of that content.

Various other functions and advantages are described and suggested below as may be provided in accordance with the various embodiments.

FIG. 1A illustrates an example situation 100 in which an interface on a display screen 104 of a computing device 102 might display content to a user per conventional approaches. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, a user has navigated to (or otherwise arrived at) a specific category page 106, which includes content for several different content posts 108. Other approaches to arriving at such a display of content can be utilized as well, such as entering a search query that causes a set of search results to be displayed on the display screen, etc. Various other approaches can be used to obtain a similar set of results, or similar display of content, such as by the user navigating to a page corresponding to that type of content.

While such approaches can be very useful and beneficial for users in many instances, there are ways in which the exposure of the user to content can be improved. For example, in a search context the user must search for a specific type or category of content, and must generally know the right categories to be able to obtain the corresponding content. As such, in applications such as this, content is ranked in decreasing order of relevance. In this way, in the situation where the user intent is mostly to see specific information, the most relevant content is shown first and less relevant ones are shown lower in the results list. In various applications, an experience more akin to window shopping might be desirable, where a user can view content that might be of interest to the user, regardless of specific type or category in at least some embodiments, and view or obtain information on anything that catches the user's eye. Further, the user might want to be able to view content that is more likely to be of interest to the user than a category or type of content, where content is typically arranged by price, rating, or other criteria that are not necessarily tied into the particular preferences of the user. Similarly, the ability to display content that the user is likely to view and/or purchase can help the provider of the content, as the profit and/or revenue to the provider will increase if content of greater interest to the user are prioritized in the presentation of content.

Figure 1B:
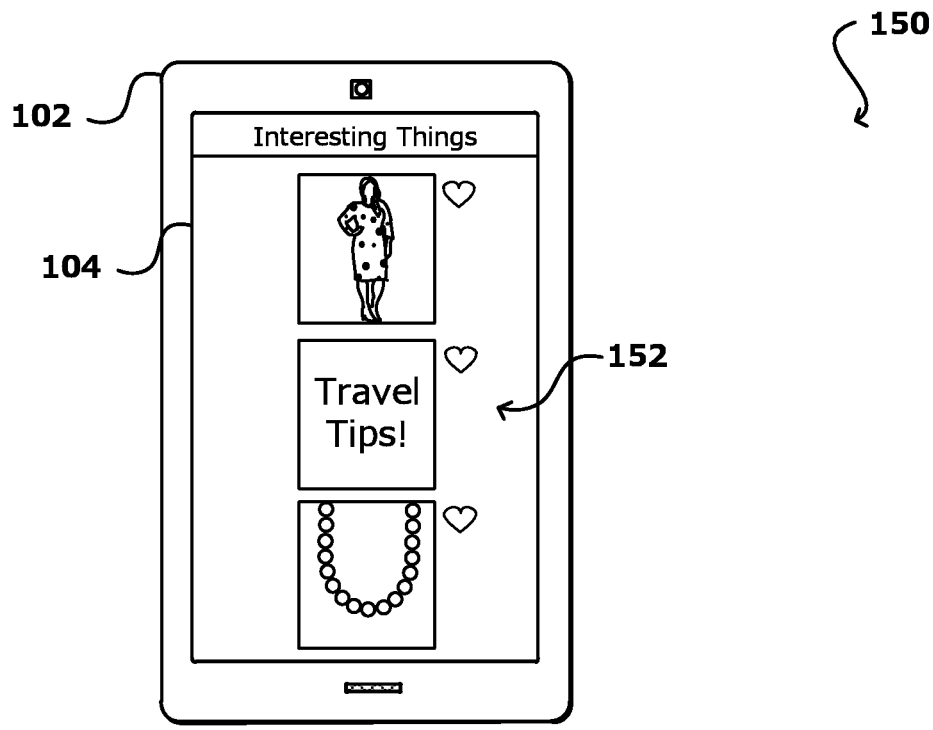

Systems and methods in accordance with various embodiments can address these and other concerns by providing an visual-based search experience that enables users to quickly scan through content relating to items that are likely to be of interest to the user. The content visual can be one of a number of visual representations. For example, the visual representations can include text-based representation, image-based representation, video-based representation, among other such visual representations. Further, such an approach can improve the likelihood of user engagement, clicks, purchases, and revenue to the provider of that content. The situation 150 illustrated in FIG. 1B provides an example of one such interface that can be utilized in accordance with various embodiments. In this example, the user has selected an option 110 to obtain such an experience, as illustrated in FIG. 1A, although in some embodiments the user might be able to directly access or be automatically redirected to such an experience. For the selected experience, a set of content (e.g. a feed of content) is determined to be of interest to the user based upon information known about the user and the content. This can include, for example, a likelihood of the user "clicking on" or otherwise selecting a representation 152 of the content to obtain further information about the content presented. This can also include a likelihood of the user consuming (i.e., purchasing, renting, downloading, or otherwise obtaining) the content represented. As discussed later herein, these relevance values or probabilities can be based upon information such as past view or purchase history of that user, as well as information about features of the content being represented, among other such options. The relevance values can be used to rank or otherwise order the content such that content that is more likely to be viewed, shared, purchased etc. by the user are presented first, or at the top of the images in the figure, in order to enable the user to more quickly and easily locate content of interest. As the user continues to scroll the feed of content, the user can be presented with other relevant content that is likely to be viewed by the user. Such an approach increases the session length (i.e., amount of time user spends on the feed), which can lead to lower chances of abandonment (e.g., a user closing the application.)

Figure 2A:
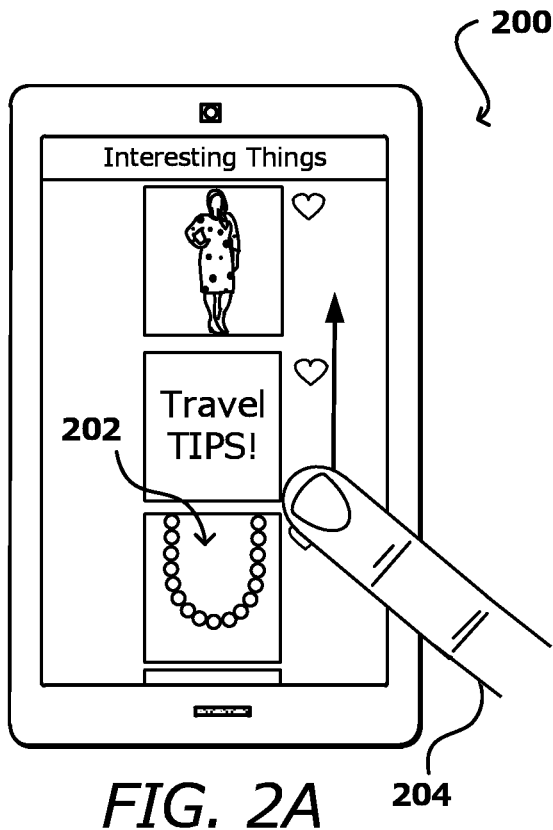
FIGS. 2A, 2B, and 2C illustrate an example of displaying content in accordance with an engagement profile in accordance with various embodiments.

In order to be able to provide such an offering that is at least someone personalized for a user, some information needs to be obtained about how likely users, and in particular that user, are to click on, view, purchase, share, or otherwise interact with content represented in the feed of content. One way to obtain this information is to monitor the activity of users with respect to various content, and attempt to predict the actions of those users with respect to related content. For example, in the situation 200 of FIG. 2A a feed of content items are displayed on a computing device, where each content post may includes a representation of an item of interest. The items can correspond to various items such as products offered for sale, images of scenes, images of events, text, images that include information, and various other items. It should be understood, however, that the content posts can relate to various other types of content as well, and items offered for purchase are merely an example for purposes of discussion. Further, although not shown there can be ways to filter the content shown or select categories or types of content, among other such options.

Figure 2B:
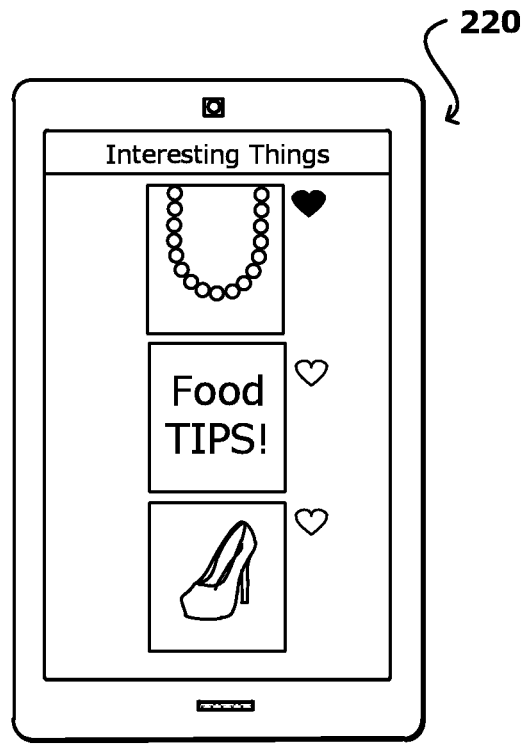

If the user is interested in content post 202, the user can select content post 202 using a finger 204, or other such selection mechanism as known in the art, to cause that content post to be selected via the computing device. In this example, the content post 202 interacted with corresponds to a necklace. In this example, the user has not selected the content post to view additional information about the content; rather, the user has selected the graphical icon, i.e., the heart, proximate to the content post Selecting the icon indicates the user is interested in the content. The user can browse the feed of content by scrolling through the content. Each content post is associated with a position in the feed. As the user scrolls through the content, content at later positions in the feed can be displayed. In the situation 220 of FIG. 2B, additional representations of content are displayed on the computing device as the user scrolls through the content. As mentioned, the user can select any of the content displayed. The selection of a content item can cause a page of information to be displayed on the computing device. The user can share the content post, save the content post, and purchase items represented in the content if available. The way in which the user interacts with the content can be stored and user interaction information can be used to rank and provide other content for display. For example, in various embodiments, the user can select an option to purchase an item represented in the content. The purchase of an item is often referred to as a "conversion" in e-commerce vernacular, where a visitor to a website has been "converted" to a paying customer, or a view has been converted into a transaction, etc. By tracking the conversions for a customer (or type of customer, group of customers, etc.) a content provider can determine the types of content a user is likely to purchase based on past purchase history, and can use this to recommend other items to those users.

In accordance with various embodiments, the selection of content can, if the content corresponds to an advertised item, result in revenue for the provider of the content (i.e., website). Such a model is often referred to as a "cost per click" or CPC model, wherein an advertiser agrees to (or bids on) an amount to be paid to the provider in response to a user selecting or "clicking" on content corresponding to the advertised item, which then causes additional related information to be displayed or otherwise provided to the user. Other mechanisms for electronic content advertising, and further details on these mechanisms, are well known in the art and, as such, will not be discussed in detail herein.

User behavior such as in the situation where the user has caused new click and conversion data to be obtained can be used to update relevance values for the user for certain types of content, or features of the content, which then can be used to select and/or re-rank a new set of content posts to be displayed to the user. For example, a new set of data can be displayed where an item purchased or otherwise selected, shared, etc. is no longer displayed, although for certain types of content and/or certain situations the content post might still be displayed where an additional purchase might occur, etc. A different selection and ordering of content can be presented, with respect to the selection and ordering based at least in part upon the updated user behavior data. It should be understood that other information can be used to update the ordering and selection as well in light of the teachings and suggestions contained herein. The ordering of content can be such that content posts that are more likely to be viewed, shared, purchased etc. by the user are presented first in order to enable the user to more quickly and easily locate content of interest. As mentioned, as the user continues to scroll the content posts, the user can be presented with other interests that are likely to be viewed by the user, which may increase the session length and lower the chance of abandonment.

Figure 2C:
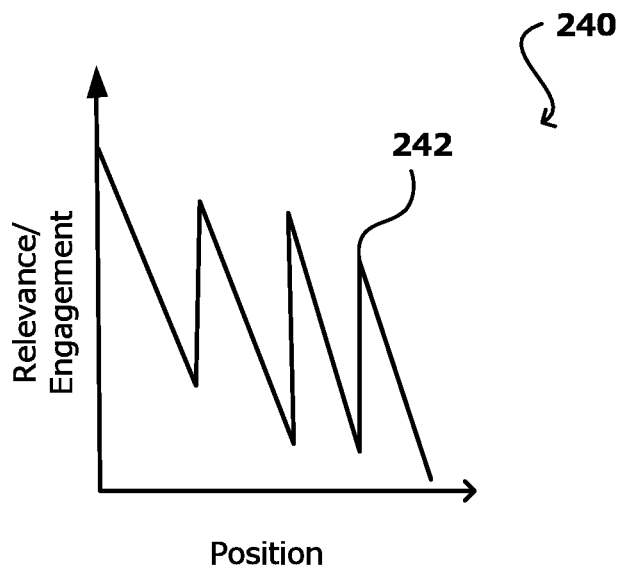

For example, situation 240 of FIG. 2C illustrates a serrated profile of relevance. It should be understood that other profiles of relevance optimizes for engagement may be used as well in light of the teachings and suggestions contained herein. As shown in in FIG. 2C, the y-axis corresponds to the relevance of a content post, and the x-axis corresponds to a position of that content post in the feed of content posts. The relevance of a content post can be determined in any number of approaches as known in the art. In this example, the example engagement profile substantially represents a saw tooth pattern where the $i^{th}$ 242 spike is defined by the pair ($s_i$, $d_i$), where $s_i$ is the span of positions on the x-axis and $d_i$ is the decay in relevance in that span. As shown in the graph, as the user continues to scroll the feed of content, the user can be presented with other relevant content that is associated with a relevance value indicating that the user will likely view the interest. It should be noted that although a saw tooth pattern is shown, any such pattern known in the art for engagement may be utilized. Such patterns may include a cosine-like pattern, a sine-like pattern, or other such pattern. In certain embodiments, the pattern used in an engagement profile can be learned or customized for a customer. For example, over multiple sessions or based on the subject matter of a customer's browse session, the system can dynamically change or select a pattern in a customer's engagement profile. Additionally or alternatively, the pattern may change during a customer's browse session (e.g., if during the browse session, the customer selects an item in a category, the system may switch to a different pattern. In various embodiments, customers may be grouped (e.g., based on a co-occurrence graph or other such graph) and a pattern may be selected for the group based on any number of metrics, such as similar purchase history, browse history, etc.

Figure 3:
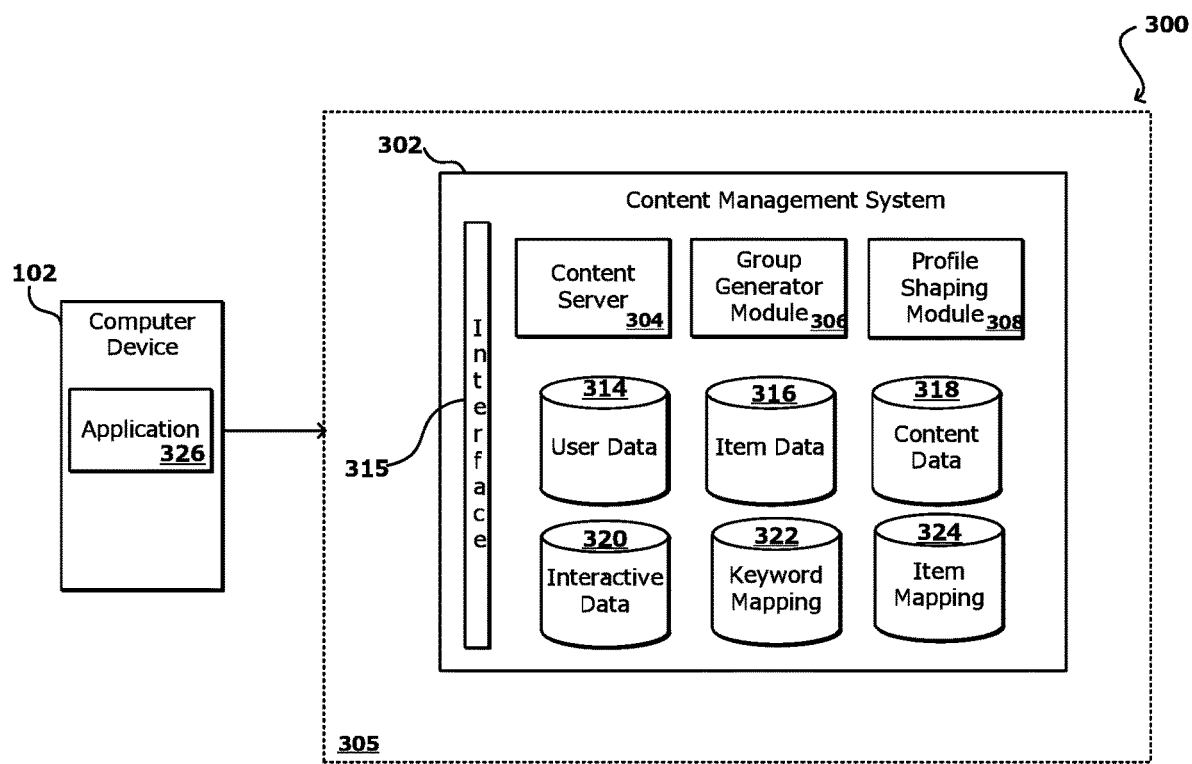
FIG. 3 illustrates an example system for profile shaping to facilitate engagement in accordance with an embodiment.

FIG. 3 illustrates an example system 300 for profile shaping to facilitate engagement in accordance with an embodiment. As shown in FIG. 3, a content management system 302 associated with an entity 305 such a service provider can include content server 304, a group generator module 306, and a profile shaping module 308, although additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

The content management system 302 may also include various data stores to store data and/or files in connection with group determination and customized content generation. For example, the content management system may include a user data store 314 to store data about individual users, including information regarding user preferences, demographic characteristics, groups to which the users have been assigned, etc. The content management system may also include an item data store 316 to store data about individual items, including information regarding characteristics of the items, content associated with the items, groups to which the items have been assigned, etc. The content management system may also include a content data store 318 to store the corpus of content (or information about the content) available to be distributed to user devices. The content management system may also include an interaction data store 320 to store information about the various interactions that users have performed with content, such as requests for content, purchases of items referenced in the content, etc. The content management system may also include a keyword mapping data store 322 to store information about the relationships between various keywords used in search queries, keywords associated with content and/or items, etc. The content management system may also include an item mapping data store 324 to store information the relationships between various items and keywords (e.g., items purchased, or item-specific content being requested or viewed, by a user during a same browsing session as a search query with particular keywords is submitted by the user). The data stores and other components of the content management system and described herein are illustrative only, and are not intended to be limiting. In some embodiments, fewer, additional, and/or alternative data stores and/or components may be implemented by a content management system.

The content management system 302 may be implemented on one or more physical server computing devices that provide computing services and resources to users. In some embodiments, the content management system (or individual components thereof, such as the content server 304, group generator 306, etc.) may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content management system may include any number of such hosts.

In some embodiments, the features and services provided by the content management system 302 may be implemented as web services consumable via a communication network. In this example, one or more third party content providers may provide information operable to be used to display a feed of content. For example, a third party content provider may provide user behavior data associated with content or other interaction data, user relevance scores associated with content and users, user preference data, as well as other such data described herein via a network to the content management system. In various embodiments, the third party content provider can specify a type of relevance profile for which to rank the provided or otherwise obtained content. In response to receiving the content and other such information from the third party content provider, the content management system can provide the third party content provider content ranked in accordance with the selected relevance profile based at least in part on the data provided by the third party content provider. In further embodiments, the content management system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device to access and interact with content managed by the content management system 302. In some embodiments, a user may launch specialized application software, such as a mobile application 326 executing on a particular user device, such as a smart phone or tablet computer. The application 326 may be specifically designed to interface with the content management system for accessing and interacting with content. In some embodiments, a user may use other application software, such as a browser application, to interact with the content management system.

In this example, the computing device 102 can request content from the service provider via a communication network. For example, computing device 102 can request content such as text, documents, audio recordings, video, images, animations, and the like. The content request can be received at content server 304. The request can be received at, for example, a network interface layer 315 of the similarity service 202. The network interface layer can include any appropriate components known or used to receive requests from across a network, such as may include one or more application programming interfaces (APIs) or other such interfaces for receiving such requests. The network interface layer 315 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service of the content management system.

For example, when a user accesses application 326 on a computing device 102 to retrieve content, the computing device may establish a connection with the content management system 302. The computing device may receive content from a content server 304 of the content management system via the connection. The content may include network resources such as Web pages, content posts, documents, images, videos, and the like. Illustratively, the content may be received as an individual piece of content (an individual Web page) or as a "feed" of multiple pieces of content (e.g., a continuous stream of content posts, content, items, or "interests"). A user of the computing device can interact with the content by activating links to other content, submitting search queries, initiating the purchase of items referenced in the content, etc. Information regarding user interactions with the content can be transmitted to the content management system for processing by content server 304. In addition, information regarding the interactions, or some subset thereof, may be stored for use in determining groups of similar items and/or users. For example, information regarding interactions may be stored in the interaction data store 320.

A group generator 306 may use interaction data such as user behavior data or other such data to determine groups of items referenced in content and/or users that have interacted with the content. For example, group generator may analyze the interaction data to identify groups of items that tend to be of interest to groups of similar users. In another example, the group generator may analyze the interaction data to identify groups of users that tend to interact with content regarding groups of similar content items.

The groups generated by the group generator 306 can be used to customize content that is provided the users. For example, when a user requests content from or otherwise establishes a connection to a content server 304, the content server can obtain information regarding the group or groups with which the user is associated. The content server can then obtain information regarding particular items that are also associated with the same groups, and the content server can customize the content that is provided to the user based on the items. Illustratively, the content server may emphasize content regarding the identified items in the content that is provided to the user by including recommendations for items, recommendations for content regarding the items, etc.

The profile shaping module 306 can utilize relevance values, abandonment scores associated with a feed position of an interface to ensure that content displayed is optimized for engagement. This can include, for example, determining an optimal order of placement of content in a feed of content as well as displaying content for a variety of types of items having different item feature values. As described, relevance values can be based upon information such as past view or purchase history of that user, as well as information about features associated with items represented in content, user behavior, among other such options. Abandonment scores can indicate a relevance below an abandonment threshold for which the user will abandon the feed at a position for a plurality of positions. For example, the feed can include content at certain positions in the feed of content posts. The first content post associated with a first relevance score can be at position one. The second content post associated with a second relevance score can be at position two and so on. As the user browses the content posts in the feed of content posts, it can be determined at which position the user exits the application (i.e., terminates a session with the application.) The relevance score of the item at the position where the user exited the application can be recorded and saved as abandonment score for that position. Accordingly, the abandonment score can indicate a relevance below an abandonment threshold for which the user will abandon the feed at a position for a plurality of positions. Abandonment scores can be determined for a plurality of users. As described, users can be associated with groups of users, where those groups of users can be associated with an abandonment score. Accordingly, for users or at least groups of users, the likelihood of abandonment at a given position in a feed can be determined.

Once at least the relevance values and the abandonment scores are determined, a sorted list of content posts can be determined. For example, a first relevance profile can be determined. The first relevance profile can be configured to display relevant content in response to a search query. This can include, for example, sorting content posts in decreasing order of relevance. The first relevance profile can be shaped to a second relevance profile configured to encourage user engagement. Shaping the first relevance profile (e.g., a task completion profile) to a second relevance profile (e.g. an engagement profile) can be accomplished in any number or ways as known in the art. In one such example, let the input to the profile shaping module be relevance scores $\{r_1, r_2, \ldots, r_n\}$ and abandonment scores $\{a_1, a_2, \ldots, a_n\}$. Let S be the sorted list of items in decreasing order of relevance. While the S is not empty, the profile shaping module greedily creates a span $(r_{i1}, r_{i2}, \ldots, r_{ik})$ of maximum length such that $$i_1 = \text{start; and}$$

$$\prod_{j=1}^{n}(1 - r_{i_j}) \le a_n, \text{ for positions } 1 \le n \le k$$

In this example, the profile shaping module can greedily pack the content posts subject to the constraint that the probability of user abandoning the feed at position p is no more than $a_p$. The process can continue until there are no content posts to be ranked. As mentioned, an example second relevance profile substantially represents a saw tooth such as the one illustrated in FIG. 2C.

Figure 4:
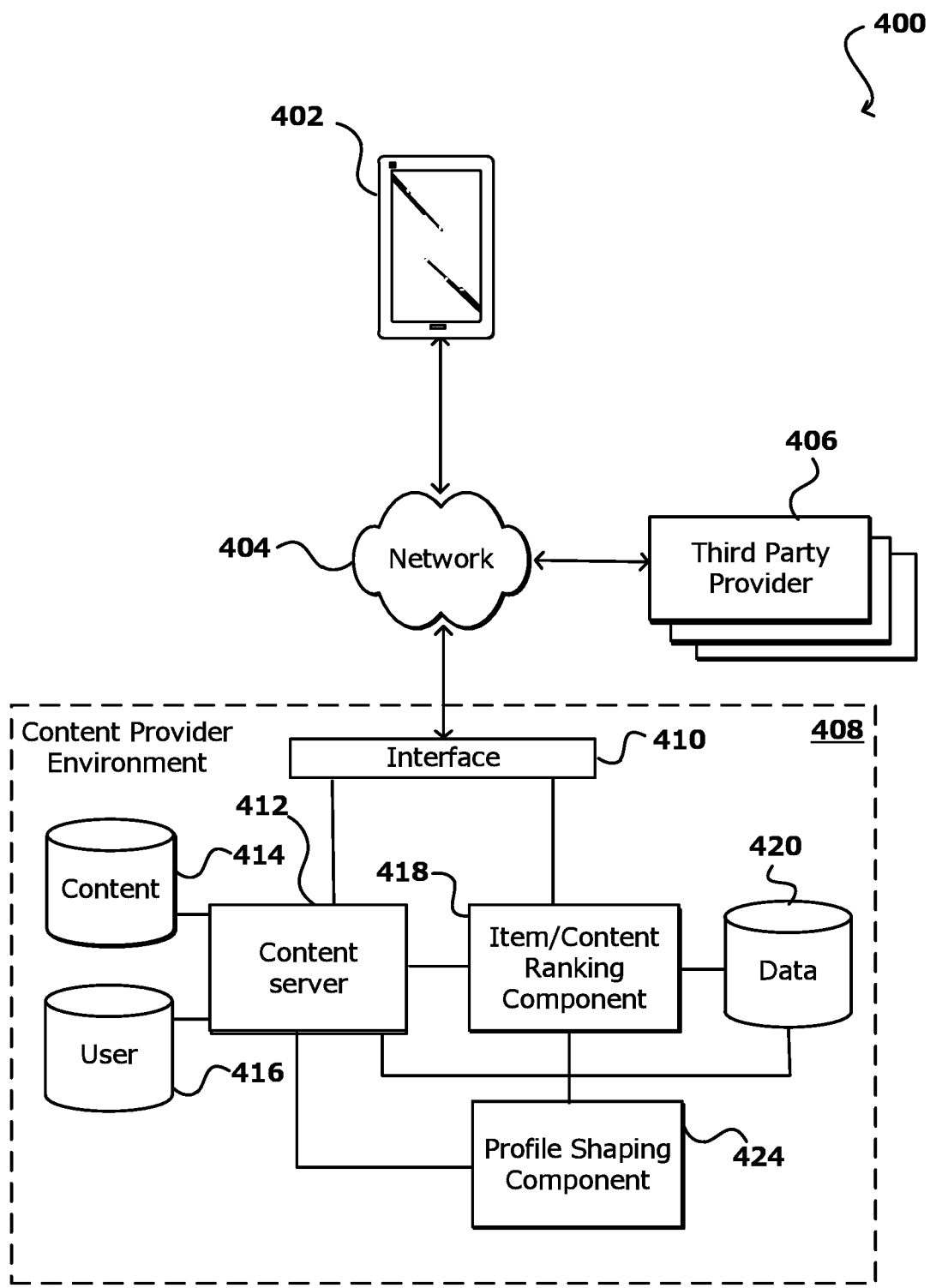
FIG. 4 illustrates an example system that can be used to determine content to provide for viewing by a user that can be utilized in accordance with various embodiments.

FIG. 4 illustrates an example environment 400 that can be used to implement aspects in accordance with various embodiments. In FIG. 4, a client computing device 402 can submit a request for content across at least one network 404 to be received by a content provider environment 408. In this example, a call received to the resource provider environment 408 can be received by an interface layer 410 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content servers 412 (e.g., content server 304), which can obtain the content from a content data store 414 (e.g., content data store 318) or other such repository to be sent back across the network(s) to the computing device. In some embodiments, information for the request might also be compared against user data in a user data store 416 (e.g., user data store 314) or other such location do determine, for example, whether the user has access rights to that content. In one example, the content can include a plurality of images, text, graphics, etc. to be displayed as part of a set of search results or set of potential items of interest, although various other types of content can be utilized as well within the scope of the various embodiments.

In some cases, a request received to the content provider environment 408 might be from another entity, such as a third party provider 406. As discussed previously, such providers may provide content to be displayed to users as part of, or along with, the served content. The interface layer can determine the type of request and cause information to be forwarded to an image processor, item ranking component 418, or other such element, which in some embodiments can cause the content to be stored to a content data store 420 or other appropriate location. Any information associated with the content, such as a description or identification of one or more features of the items represented in the content, can also be provided and stored in the data store 420. In at least some embodiments, information about features of the items can be determined through components of the content provider environment, or otherwise determined. Further, in at least some embodiments, content that is approved to be served as content to a user can be transferred to the content data base 414 or another appropriate location. In situations where content streams are computed offline, as discussed elsewhere herein, the stream data, e.g., feed, can potentially be stored in the content repository 414 or the data repository 414, which can be accessed by the content server in order to select and/or provide item and/or ad content to the computing device. The content server 412 can then blend in advertisements or otherwise modify the stream, although in other embodiments such functions can be performed by a third party provider 406 or other such entity.

When a set content is to be provided to a user, the content server 412 in this example can contact an item ranking component 418, or other such system or service, in order to determine which content is to be displayed, and in what order. The item ranking component can receive information such as a user identifier or session ID in order to determine which probabilities to use in determining the selection, although various other types of information can be used as well as discussed and suggested elsewhere herein. Profile shaping component 424 can utilize the relevance values and abandonment scores associated with feed position information to ensure that content displayed is optimized for engagement. This can include, for example, determining an optimal order of placement of content in a feed of content as well as displaying content for a variety of types of items having different item feature values. As additional data for the user is gathered, such as through the user interacting with content having specific feature values, the rankings can be updated accordingly. The rankings and selection can be used to determine the content to present to a user, and the arrangement of that content, which can improve the overall user experience while increasing profit for the provider of that content.

In one example, a page of content might display various types of content, such as apparel items, travel destinations, cooking tips, among other such content. The content can be represented using any one or more of a number of techniques. For example, the content can be In order to determine which of the items the user is most likely to view, the item ranking component can look at data for that user with respect to features of various items for which data has been obtained. This can include both data obtained across users and data obtained for a particular user. For example, the content provider might have some data about a specific feature with respect to a user, but that data might be limited. If the data is traveling, for example, there might be data with respect to some of the travel destinations the user has viewed, ignored, or otherwise had some interaction, but there might also be other travel destinations for which there is no data for that user. Accordingly, at least some level, weight, or amount of probability can be utilized that reflects the probability of an average user, or users with at least some aspects in common with the current user, with respect to a particular travel destination, travel tips, travel experiences, etc. This helps the user to discover content associated with travel that the user might not have encountered previously. Further, the blending of aggregated data for multiple users with the actual data for a specific user provides many additional data points for use in determining a probability of a user interacting with specific content. Further still, the profile shaping component can optimize the relevance profile, which affects the content displayed, for engagement. As such, items further down the users feed may include items associated with a high relevance (e.g., a relevance approaching the relevance of the beginning items in the feed.) Various other features and aspects can be utilized as well as discussed elsewhere herein.

Once a relevance profile is determined, the data can be passed to the content server 412 in this example, which can generate the appropriate code or otherwise cause the corresponding content to be provided for the user. This can include, for example, generating HTML to be rendered in a browser application on the client device to enable content for the items to be displayed in an arrangement based at least in part upon the determined ranking. In some embodiments a diversity component can be part of, or installed in, the content server, while in other embodiments it can be a separate component or service that may be called by the content server, among other such options.

As mentioned, it can be difficult to gather enough information about specific content for specific users to generate accurate relevance. While data can be aggregated across multiple users in order to determine average relevance scores across users, or maybe certain types of users, this still will not provide optimal relevance scores for a specific user in many instances. Accordingly, approaches in accordance with various embodiments instead attempt to obtain or track data for a user with respect to a plurality of types of features, and use this data to attempt to determine relevance scores for that user with respect to other content based on the values of those features for that content. While the term "features" is used herein, it should be understood that values can be determined for various properties or other aspects that might be used to distinguish one type of content from another, as should be apparent to one of ordinary skill in the art in light of the teachings and suggestions contained herein. For example, one category of content might be associated with traveling. A user might often buy items for travel, save content associated with travel destinations, etc. but never (or very infrequently) interact with content associated with cooking. Accordingly, content with a feature value associated with traveling can have higher probabilities of view and/or purchase than content without. For a feature such as color, content with colors that the user purchases more frequently (whether in general or for a specific type of item) can have higher probabilities than content with other colors. Style can be another feature, as a user might always purchase shoes with flat heels and never high heels, such that items with high heels can have higher probabilities. As data is gathered for various values across various features, the accuracy of the probabilities can increase accordingly. The values in some embodiments also might decay or otherwise change in order to enable the probabilities to change over time as the user's preferences or tastes change.

When information for a new category of content is received, the feature values for that type of content can be determined and the relevance values predicted based on information known for that user for various features. It should be understood that not every content post will have a value for every feature, and that some feature values for a content post may not be available to the system, but the relevance values can be based at least in part upon the information available. An appropriate probability model, such as a beta-Bernoulli or Bayesian regression model, can be used to gather the values for the various features and generate the relevance values for both clicks and conversion for various types of content with respect to a user (or group of users, etc.). Such a model can also provide an uncertainty, or variance, which can be used to assist in the rankings of the various types of content. Different features might have different amounts of uncertainty in general, as a type of content might have less uncertainty of view for a particular user than other features, etc.

Figure 5:
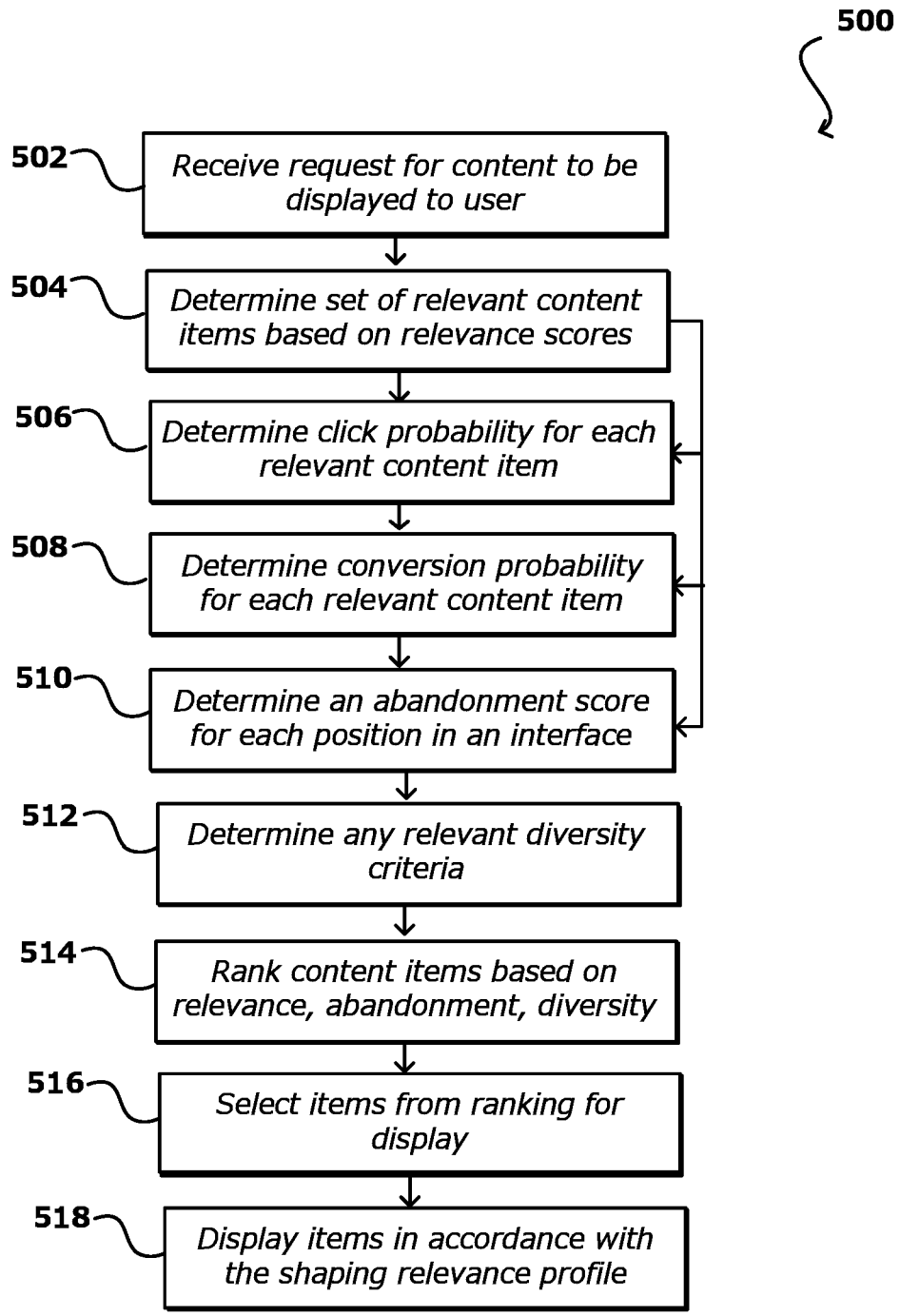
FIG. 5 illustrates an example process for determining content to be provided for a user that can be utilized in accordance with various embodiments.

FIG. 5 illustrates an example process 500 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request is received 502 for content to be displayed on (or otherwise presented via) a computing device, in this case for a particular user of the computing device. In response to the request, a set of relevant content items (e.g., content posts, interests, items, etc.) based on relevance values can be determined 504, where that set can, in different embodiments, include some or all of the content that could be provided in response to the request. This can include, for example, a set of content posts and related information for items in a category corresponding to the request.

In order to determine which of the content posts to display, and the order or arrangement in which to display those content posts, a number of pieces of information can be determined or obtained for at least a portion of the corresponding items to determine a relevance score for those items. While the information is shown in the figure to be done sequentially for purposes of explanation, it should be understood that in many cases at least some of these steps will be done concurrently or in different orders as mentioned above.

In this example, a click probability is determined 506 for each relevant item. As mentioned, this can include a click probability for the particular user or a general user, as may be based upon historical click data for the particular user and/or other users. In addition, a conversion probability (or other such metric) can be determined 508 for each relevant item in order to determine the likelihood that the user would interact with (e.g., purchase or otherwise consume or obtain) the item represented in content post if displayed. As with the click probabilities, this can be specific to a user or can apply to a type of user, for example, and can be based upon specific user data and/or aggregated data from multiple users with respect to that item, related items, items in that category, items with similar features, and the like. It should be understood in light of the present disclosure, however, that other factors can be used for such a determination, and factors such as the conversion probability distribution can be calculated to include the click probability distribution as well, among other such options. The probabilities can be determined in some embodiments by sampling from a beta distribution for each item, among other such options.

In additional to the relevance scores, an abandonment score can be determined 510 for each position in an interface that displays the items in order to determine the likelihood of a user session terminating. This can include, for example, the situation where a user exits an application for viewing content at a given position in the interface of the application. As with the click probabilities and the conversion probability, this can be specific to a user or can apply to a type of user, for example, and can be based upon specific user data and/or aggregated data from multiple users with respect to that position. In some embodiments there can also be specific diversity rules or guidelines that can further affect the way in which items are selected, ranked, or otherwise prioritized. For example, if a user is browsing in an apparel category that includes accessories, it is possible without diversity criteria that an algorithm selecting based primarily on a particular feature would show mostly jewelry, designer handbags, and designer heels, for example, and would rarely show items such as shorts, socks, and other lower cost items. Similarly, if the apparel category has thousands of shirts but only a handful of watches, without diversity criteria it is possible that a user might very rarely see content for a watch or other such item, even if the user is interested in that type of item. While this might be desirable for some providers, such selection can turn off certain potential customers and it may thus be preferable in those situations to ensure that a mix of items is displayed.

This can include, for example, ensuring that at least a certain percentage or number of content posts shown are from a first category of content, a second category of content, etc. For example, rules might indicate that a first category of content (e.g., shoes) may make up at most 30% of the displayed content, or that a second category of content (e.g., travel locations) make up at least 25% of the displayed content. This can include taking, for example, the appropriate number of highest relevant content posts from each category. In order to improve diversity, however, a sampling of highly relevant content might instead be taken such that a refresh of the results by the user would likely return a different selection of content. Thus, it can be desirable in at least some embodiments to determine 512 whether any diversity criteria exist, and apply those as appropriate. Further, diversity criteria can apply to features of content within a category (or across categories) as well, such that a certain brand of an item is only displayed up to a certain number of times in a set, a minimum number of styles is displayed, etc. Various other diversity criteria can be applied as well as should be apparent to one of ordinary skill in the art in light of the teachings and suggestions contained herein.

In at least some embodiments, there will be a tradeoff between diversity and relevance, so a provider can have the option of determining how to strike that balance, such as by setting caps, maximum or minimum item numbers, minimum relevance ranges, and the like. An example algorithm presents one parameter that determines the balance between meeting the given ideal category distribution and purely ranking according to estimated relevance. This parameter can be tunable and determinable based upon various criteria. Diversity can also be used to ensure the items are not grouped together when displayed, such that shoe content posts might be spread relatively evenly across the display as opposed to being bunched together, etc.

Once the relevance value is determined for each item in this example, the abandonment score for each position, and any diversity rules or other criteria are applied, the items can be ranked 514, ordered, or otherwise selected based on relevance, abandonment, diversity, and other factors discussed herein. At least a portion of the items, such as particular arrangement (e.g., saw tooth) of highest ranked items (in general or in specified categories), can then be selected 516 to have content posts or other related content provided for presentation (e.g., display, play, or projection) to the user, and can be caused 518 to be presented to the user in accordance with the shaping relevance profile. As mentioned, in conventional searching/ranking applications, items are sorted and displayed in decreasing order of relevance. For example, a first sorted list of items can be determined based on a monotonic profile of relevance that sorts items in decreasing order of relevance. However, as mentioned, in applications where the user is looking to be inspired, a monotonic profile of relevance can quickly lead to boredom. Once the user encounters an irrelevant post, the user may perceive that the relevance of posts further down the list of results will be even lower, which may result in user abandoning their search and/or at least a jarring experience. Accordingly, a sorted list of items can be determined based on a shaping relevance profile that can receive as inputs the relevance values, the abandonment scores, and any diversity rules or other criteria which can affect the way in which items are selected, ranked, or otherwise prioritized such as to optimize the list for engagement. As mentioned, the selection can include sampling a highly-ranked (not necessarily highest) number of items in each of a set of categories in at least some embodiments that decrease and then increase in relevancy. As mentioned, this can include arranging content in a feed of content in order to enable a user to quickly scan content for a large number of items and locate items of interest to the user and to want to continue to scan the content. Such a process has additional benefits for the provider, as the user will be further engaged and session length increased, which can help to increase the likelihood of the user finding interesting content and utilizing services of the provider.

Figure 6:
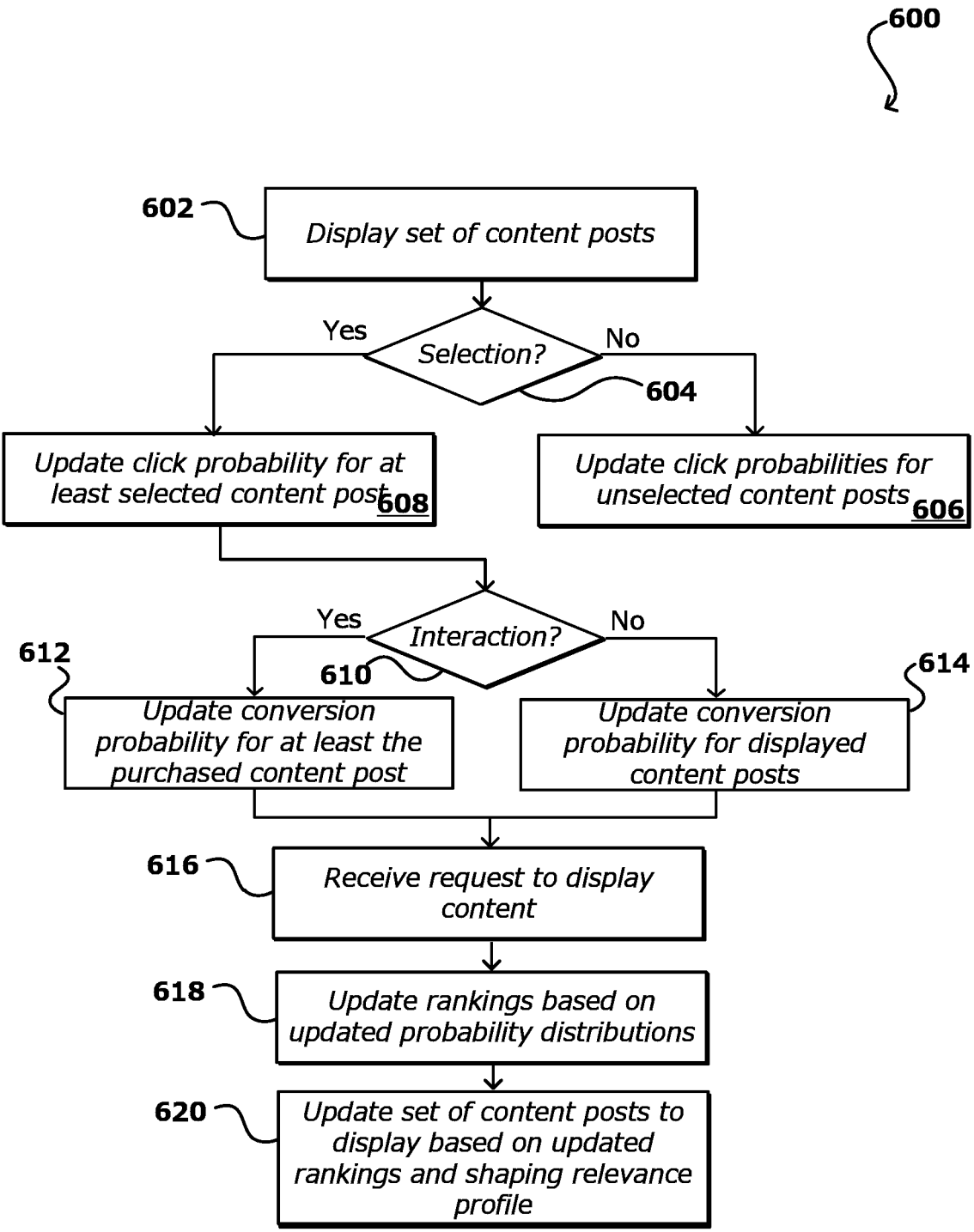
FIG. 6 illustrates an example process for updating relevance scores that can be utilized in accordance with various embodiments.

FIG. 6 illustrates an example process 600 that can be used to collect and/or update relevance scores for a user that can be utilized in accordance with various embodiments. In this example, a set of content posts are displayed 602 on a computing device. The content posts can be represented in text, images, video, graphics, among other such formats. If a selection is detected 604 with respect to one of the content posts, such as in response to a user clicking on or otherwise selecting a portion of the interface or display associated with that content post, the click probability distribution data with respect to features of the selected content post can be updated 606. This can include, for example, determining the values for various features (i.e., brand, color, size, style, scene, activity, category, etc.) associated with the content posts being presented, and causing data to be stored that represents the fact that the user selected the content posts. If a selection is not made, click probability distribution data or other behavioral data might be updated 608 for features of the content posts that were not selected, in order to indicate that the user did not select content posts with these features. In some embodiments, both will be done in order to update probabilities for both content posts that were and were not selected.

For the content posts that were selected for viewing or other access, a determination can be made 610 as to whether the user interaction is determined. This can include, for example, determining whether a purchase, share, save, like, or other selection or transaction resulted with respect to the content post. The corresponding conversion probability distributions for features of at least the selected content post can be updated 612 to reflect the conversion, although in at least some embodiments the probability distributions can also be updated 614 if the display does not result in a conversion. Based at least on this updated probability distribution data, when a subsequent request is received 616 for content to be displayed that includes similar content posts, the selection and/or ranking of the content posts can be updated 618 or otherwise recalculated or determined based on the most recent data, and the set of content posts displayed can be updated 620 (or generated anew based on the new rankings and shaping) in order to display the content posts according to the new rankings.

Figure 7:
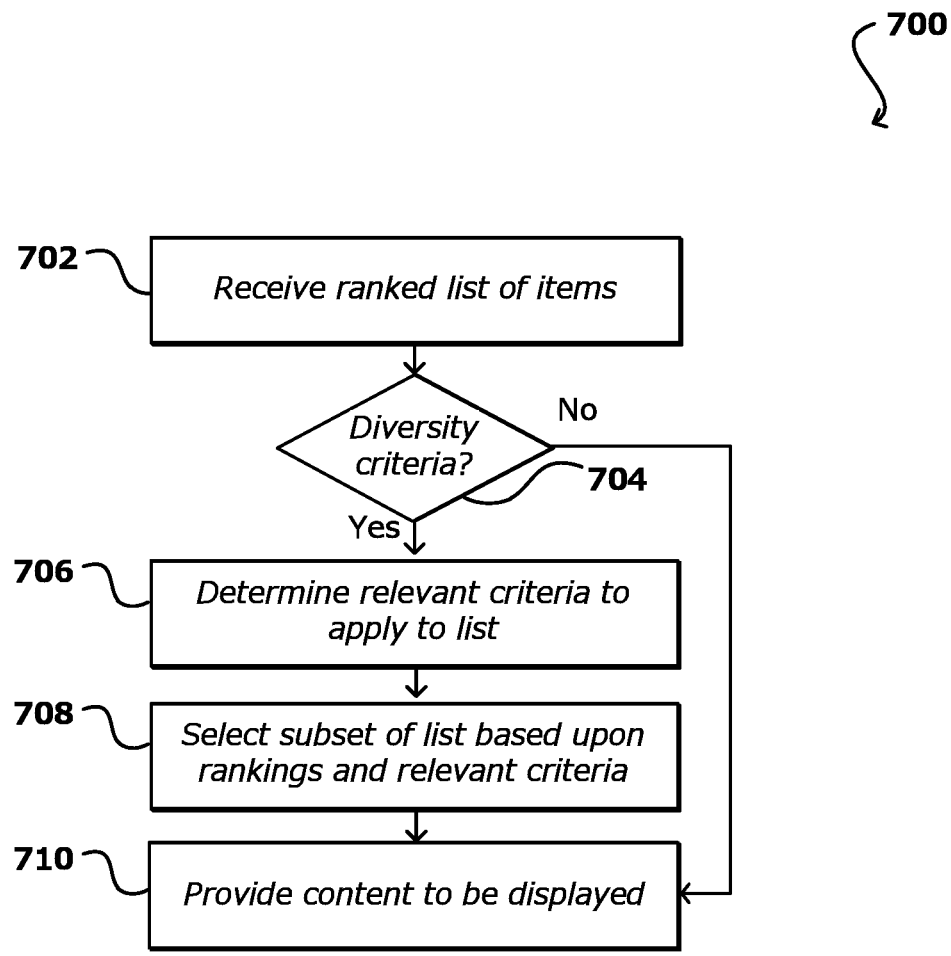
FIG. 7 illustrates an example process for applying diversity to a selection of item content that can be utilized in accordance with various embodiments.

FIG. 7 illustrates an example process 700 that can be used to apply diversity criteria in accordance with various embodiments. In this example, a ranked list of items (e.g., products, web pages, interests, or other such content) are received 702 or otherwise obtained, whether from a system in the same environment, a third party service, or other such source. If there are no diversity criteria 704 to be applied, the items can be provided 710 for display based at least in part upon a shaping relevance profile. As mentioned, the ranking can be based on relevance values and abandonment scores, but it should be understood that various other types of ranking can be used with diversity criteria a discussed herein. If diversity criteria exist, the relevant criteria for the received list can be determined 706. In some embodiments the same diversity criteria can apply to every list, while in other embodiments the diversity criteria can vary based upon any of a number of factors, such as the type of list, type of content in the list, type of user requesting content, information about the user, user preferences, provider preferences, marketing campaigns, and the like. For example, there might be different criteria for someone browsing items associated with music files than someone browsing items associated with apparel items. Further, a user who never buys shoes online might have a different set of diversity criteria applied than a user who buys primarily shoes, etc.

Once at least some of the appropriate diversity criteria are determined, at least a subset of the list of ranked items can be selected 708 based on the ranking information within the diversity criteria. As mentioned, a content post may correspond to an item, e.g., a product, information, etc. Selecting content posts can include selecting or sampling a number of items in each of a set of different categories, items with specific features, and the like, as may be specified by the diversity criteria or other such rules or policies. Within a category, for example, the highest ranked items might be selected up to a number determined by the diversity criteria, for example, or a subset of the top-ranked items within a category might be selected, among other such options. In some cases multiple diversity criteria might apply, such that within a category only a maximum number of items with a specific feature value can be selected, such that the sampling can be based upon the highest ranked items in each category that satisfy all diversity criteria. It is also possible that the diversity criteria can be prioritized or weighted, such that any conflicts between diversity criteria can be resolved automatically. Once a selection of at least a number of items is made, content for those items can be provided 710 or otherwise specified for display (or other presentation) to a user and/or on a computing device.

In accordance with various embodiments, the items can be selected using any appropriate process and/or criteria discussed herein, and can be received from a system or component within the environment or a third party service, among other such options. As mentioned herein, the lists or selections of content can be determined on a per user and/or per request basis in various embodiments. In some embodiments, streams of items can be determined using specific criteria for each stream, and then users can be selected or assigned to receive one of the streams. In some embodiments, a user might receive a pre-determined stream of content until a sufficient amount of data is available to generate a custom set of content for that user. In such cases, an existing stream might be modified to include at least a few new items of content or a whole new list can be generated, among other such options.

Figure 8:
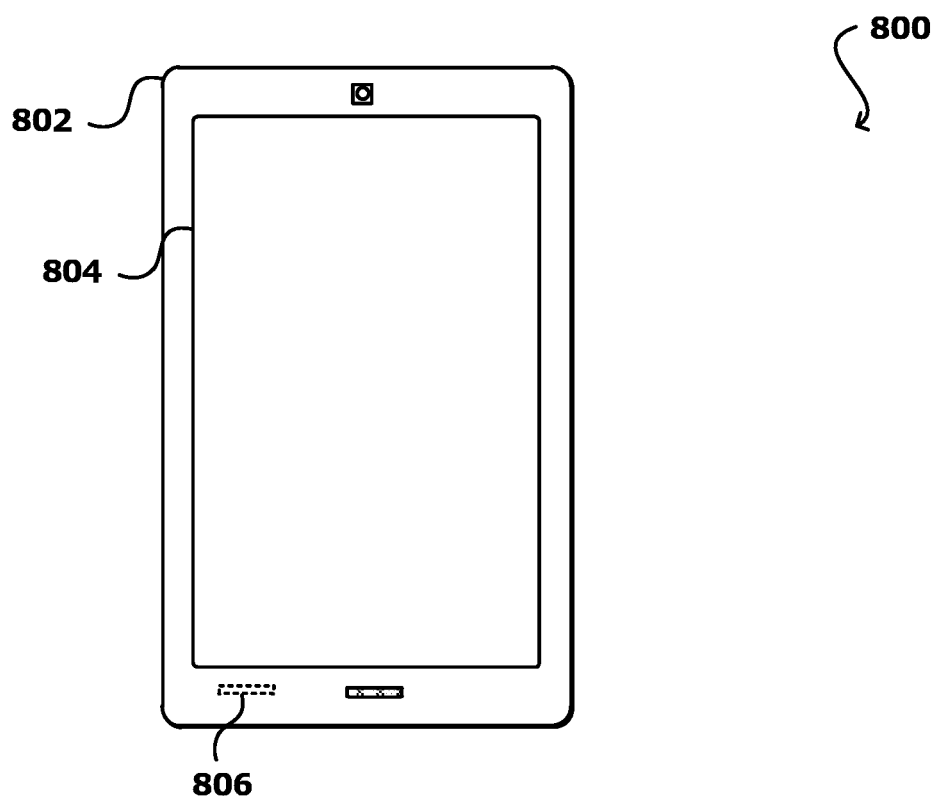
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
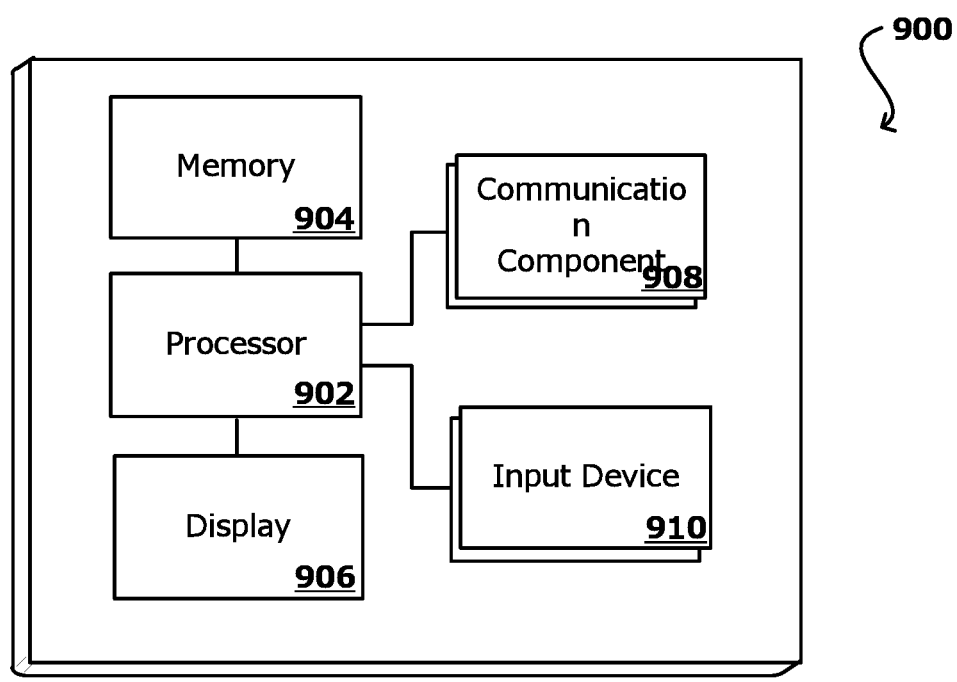
FIG. 9 illustrates an example configuration of components of a computing device, such as the device illustrated in FIG. 8.

In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
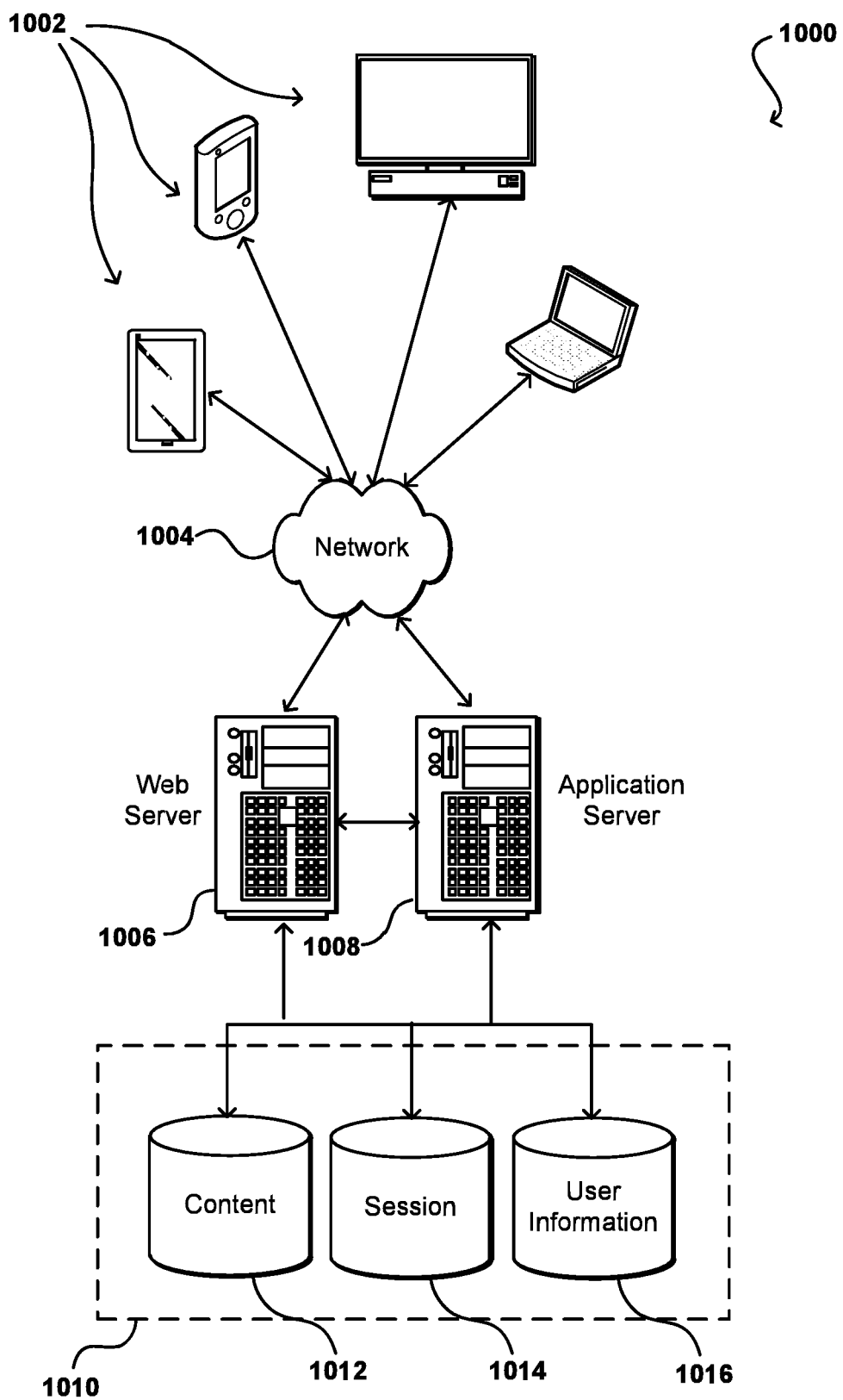
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory storing instructions that, when executed by the at least one processor, cause the system to:
      receive a request to view a plurality of items;
      for individual ones of the plurality of items corresponding to the request:
         determine a selection probability corresponding to a likelihood that a first user selection will be received to obtain content related to the item, wherein the content corresponds to a representation associated with the item being displayed and the selection probability is based on historical user session data for at least one user;
         determine an interaction probability corresponding to a likelihood that a second user selection will be received to interact with the item in response to the content related to the item being displayed;
      determine an abandonment score for a plurality of positions of an interface, the abandonment score indicating a relevance below an abandonment threshold for which a user will abandon the interface at a position for a plurality of positions;
      rank the plurality of items according to respective abandonment scores of the plurality of positions, the selection probability for individual ones of the plurality of items, and the interaction probability for individual ones of the plurality of items;
      select a subset of the plurality of items based at least in part upon the ranking, the subset including items ranked according to an engagement profile; and
      provide item visual representations corresponding to the subset for display on a computing device, wherein at least a portion of the item visual representations are able to be displayed and arranged according to the ranking, and wherein content items in at least a portion of the item visual representations are capable of display by increasing or decreasing relevancy scores.

2. The system of claim 1, wherein the instructions when executed further cause the system to:
provide a first set of item visual representations for display;
receive first data indicating an item visual representation, of the first set of item visual representations, selected in order to receive additional content about a corresponding item;
determine a respective value for features of a subset of features corresponding to the item; and
generate updated selection distribution data for features of the subset of features.

3. The system of claim 2, wherein the instructions when executed further cause the system to:
receive second data indicating at least one of a purchase, a share interaction, a save interaction, or an interest interaction that resulted from the additional content; and
update selection probability data for features of the subset of features.

4. The system of claim 1, wherein the instructions when executed further cause the system to:
determine the relevancy scores for individual ones of the plurality of items; and
determine abandonment scores for at least a subset of the plurality of positions based at least in part upon the historical user session data and the relevancy scores.

5. A computer-implemented method, comprising:
obtaining user behavior data for a user, the user behavior data indicating past user interaction with a set of content items at positions in an interface, the set of content items being associated with a value of at least one content item feature of a plurality of content item features;
determining a selection probability of content corresponding to a likelihood that a first user selection will be received to obtain the set of content items, the selection probability based at least in part on historical user selection data for the user;
determining an interaction probability of content corresponding to a likelihood that a second user selection will be received to interact with at least one item in response to at least one content item being displayed;
determining an abandonment score for individual ones of a plurality of positions of the interface based at least in part on the user behavior data;
determining a relevance value for individual ones of a plurality of content items based at least in part on the user behavior data, the selection probability, and the interaction probability; and
ranking a subset of the plurality of content items based at least in part upon a respective relevance value for content items of the subset and the abandonment score, wherein at least a portion of the subset is capable of being displayed for a user in an arrangement corresponding to an engagement profile, and wherein content items in at least a portion of the subset are capable of display by the respective relevance value increasing or decreasing.

6. The computer-implemented method of claim 5, further comprising:
determining the abandonment score and relevance value for content items based at least in part upon the historical user selection data.

7. The computer-implemented method of claim 6, further comprising:
determining the abandonment score for positions and the relevance value for content items further based at least in part upon aggregated historical selection data from multiple other users and values of content items for one or more item features.

8. The computer-implemented method of claim 7, wherein content items are associated with at least one value for at least one item feature of a plurality of item features, the plurality of item features including at least one of color, brand, designer, type of item, category of item, or style.

9. The computer-implemented method of claim 7, further comprising:
determining the relevance value for content items further based at least in part on user preferences associated with a user profile of the user and the relevance value associated with content items.

10. The computer-implemented method of claim 5, further comprising:
providing a first set of content item visual representations for display;
receiving first data indicating a content item visual representation, of the first set of item content visual representations, that the user selected in order to receive additional content about a corresponding content item;
determining a respective value for individual ones of a subset of features corresponding to the content item; and
generating updated user behavior data for features of the subset of features.

11. The computer-implemented method of claim 10, further comprising:
receiving second data indicating at least one of a purchase, a share interaction, a save interaction, or an interest interaction that resulted from the additional content; and
generating updated user behavior data for features of the plurality of content item features.

12. The computer-implemented method of claim 5, further comprising:
providing item visual representations corresponding to the subset of the plurality of content items for display on a computing device, wherein at least a portion of the item visual representations are able to be displayed and arranged according to an engagement profile.

13. The computer-implemented method of claim 12, wherein the engagement profile is operable to rank sets of the plurality of content items, sets of content items including content items being ranked from a highest relevance to a minimum threshold relevance.

14. The computer-implemented method of claim 13, further comprising:
determining a diversity criterion corresponding to the subset of the content items; and
ranking the subset the subset of the plurality of content items further based at least in part on the diversity criterion.

15. A non-transitory computer readable storage medium storing instructions that, when executed by at least one processor of a computing system, causes the computing system to:
determine a selection probability of content corresponding to a likelihood that a first user selection will be received to obtain a plurality of content items, the selection probability based at least in part on historical user selection data;

determine an interaction probability of content corresponding to a likelihood that a second user selection will be received to interact with at least one item in response to at least one content item of the plurality of content items being displayed;

receive a relevance value for individual ones of the plurality of content items for a third party content provider, the relevance value based at least in part on the selection probability and the interaction probability;

determine an abandonment score for individual ones of a plurality of positions of the interface;

rank a subset of the plurality of content items based at least in part upon respective relevance values for content items of the subset and the abandonment score; and generate a feed of the plurality of the content items based at least in part on a respective rank of individual ones of the plurality of content items, wherein the plurality of the content items in the feed are capable of display based on the respective relevance values increasing or decreasing.

16. The non-transitory computer readable storage medium of claim 15, wherein the feed is generated for a user in response to the user initiating a viewing session via an application operable to display the feed.

17. The non-transitory computer readable storage medium of claim 15, wherein a display of the feed is updated based at least in part on an expiration of an interval of time, in response to a user initiating a viewing session, or in response to a user interaction with the plurality of content items displayed on the feed.

18. The non-transitory computer readable storage medium of claim 15, wherein the instructions, when executed by the at least one processor, further enables the computing system to:

receive an indication of a type of relevance profile from the third party content provider; and rank the subset of the plurality of content items further based at least in part on the indication of the type of relevance profile.

19. The non-transitory computer readable storage medium of claim 15, wherein the instructions, when executed by the at least one processor, further enables the computing system to:

provide a first set of content items for display in the feed;

receive first data indicating a content item, of the first set of item content items, that the user selected in order to receive additional content about a corresponding content item; and generate an update to the feed, the update including at least a second set of content items based at least in part on the first data.

* * * * *